United States Patent
Luo et al.

(10) Patent No.: US 10,701,729 B2
(45) Date of Patent: Jun. 30, 2020

(54) PROTECTED CET TRANSMISSION AND RECEPTION

(71) Applicant: QUALCOMM Incorporated, San Diego, CA (US)

(72) Inventors: Tao Luo, San Diego, CA (US); Peter Gaal, San Diego, CA (US); Wanshi Chen, San Diego, CA (US); Aleksandar Damnjanovic, Del Mar, CA (US); Yongbin Wei, La Jolla, CA (US); Durga Prasad Malladi, San Diego, CA (US); Hao Xu, San Diego, CA (US); Madhavan Srinivasan Vajapeyam, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 14/728,859

(22) Filed: Jun. 2, 2015

(65) Prior Publication Data

US 2015/0351121 A1 Dec. 3, 2015

Related U.S. Application Data

(60) Provisional application No. 62/007,113, filed on Jun. 3, 2014.

(51) Int. Cl.
*H04W 74/08* (2009.01)
*H04W 72/12* (2009.01)
*H04L 5/00* (2006.01)

(52) U.S. Cl.
CPC .......... *H04W 74/08* (2013.01); *H04L 5/0048* (2013.01); *H04W 72/1273* (2013.01); *H04W 72/1278* (2013.01)

(58) Field of Classification Search
None
See application file for complete search history.

(56) References Cited

U.S. PATENT DOCUMENTS 8,989,066 B2    3/2015  Merlin et al.
2006/0187952 A1  8/2006  Kappes et al.
(Continued)

FOREIGN PATENT DOCUMENTS

CN    103312388 A    9/2013
JP    2003338822 A   11/2003
(Continued)

OTHER PUBLICATIONS

Huawei, et al., "Radio resource management for 1:M D2D conmunication", 3GPP Draft; R2-134131, 3rd Generation Partnership Project (3GPP), Mobile Competence Centre, 658, Route Des Lucioles; F-06921 Sophia-Antipolis Cedex; France, vol. RAN WG2, No. San Francisco, U.S; Nov. 11, 2013-Nov. 15, 2013 Nov. 13, 2013 (Nov. 13, 2013), 8 Pages, XP050736916, Retrieved from the Internet: URL: http://www.3gpp.org/ftp/Meetings_3GPP_SYNC/RAN/RAN2/Docs/ [retrieved on Nov. 13, 2013] paragraph [03.4]-paragraph [03.5]; table 2.

(Continued)

*Primary Examiner* — Donald L Mills
(74) *Attorney, Agent, or Firm* — Norton Rose Fulbright US LLP

(57) ABSTRACT

Protection of transmission and reception of clear channel assessment (CCA)-exempt transmission (CET) is disclosed in which channel reserving signals or protection signals may be transmitted by the transmitter or receiver of the CET. The transmitted signals may be received by the neighboring access points that could potentially cause interference with the reception of the CET.

16 Claims, 15 Drawing Sheets

(56) References Cited

U.S. PATENT DOCUMENTS

| | | | |
|---|---|---|---|
| 2012/0207036 A1 | 8/2012 | Ong et al. | |
| 2014/0341018 A1* | 11/2014 | Bhushan | H04W 28/0289 370/230 |
| 2015/0071060 A1* | 3/2015 | Bhushan | H04W 74/08 370/230 |
| 2015/0111569 A1* | 4/2015 | Gupta | H04W 4/22 455/426.1 |
| 2015/0146562 A1* | 5/2015 | Sivanesan | H04L 5/0032 370/252 |
| 2015/0215100 A1* | 7/2015 | Jeon | H04L 5/0062 370/252 |
| 2015/0223243 A1* | 8/2015 | Tabet | H04W 28/085 370/330 |
| 2015/0264699 A1* | 9/2015 | Fwu | H04L 5/0001 370/329 |

FOREIGN PATENT DOCUMENTS

| | | |
|---|---|---|
| JP | 2005354326 A | 12/2005 |
| JP | 2006229982 A | 8/2006 |
| JP | 2012169955 A | 9/2012 |
| WO | WO-2011123631 A1 | 10/2011 |
| WO | WO-2013119095 A1 | 8/2013 |
| WO | WO-2013185835 A1 | 12/2013 |

OTHER PUBLICATIONS

International Search Report and Written Opinion—PCT/US2015/033941—ISA/EPO—dated Nov. 6, 2015.
Partial International Search Report—PCT/US2015/033941—ISA/EPO—dated Aug. 25, 2015.

* cited by examiner

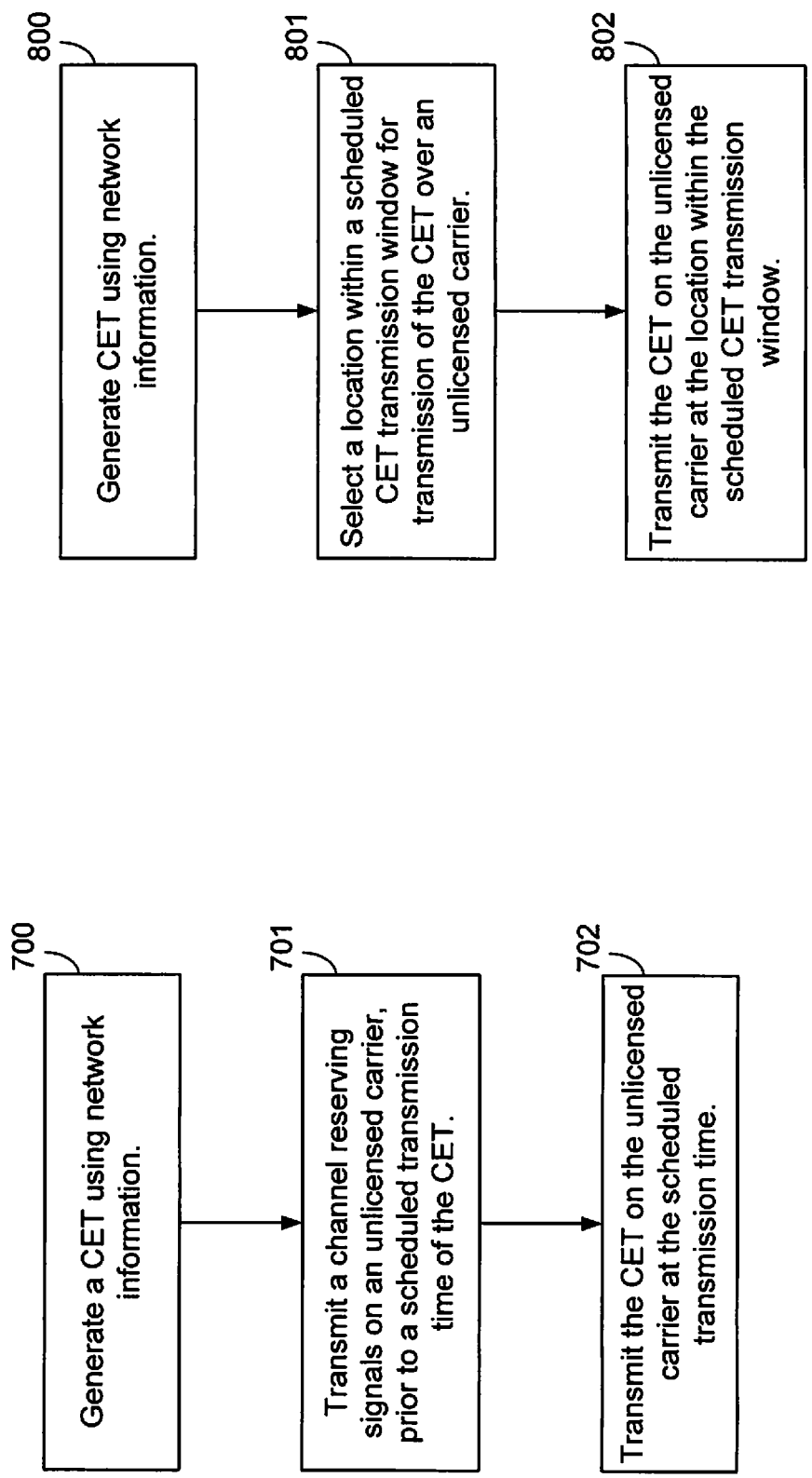

… (1)

PROTECTED CET TRANSMISSION AND RECEPTION

CROSS-REFERENCE TO RELATED APPLICATIONS

This application claims the benefit of U.S. Provisional Patent Application No. 62/007,113, entitled, "PROTECTED CET TRANSMISSION AND RECEPTION," filed on Jun. 3, 2014, which is expressly incorporated by reference herein in its entirety.

BACKGROUND

Field

Aspects of the present disclosure relate generally to wireless communication systems, and more particularly, to protected clear channel assessment (CCA)-exempt transmission (CET) transmission and reception.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes generating a control-reference transmission using network information, transmitting a channel reserving signals on an unlicensed carrier, prior to a scheduled transmission time of the control-reference transmission, and transmitting the control-reference transmission on the unlicensed carrier at the scheduled transmission time.

In an additional aspect of the disclosure, a method of wireless communication includes generating a control-reference transmission using network information, selecting a location within a scheduled control-reference transmission window for transmission of the control-reference transmission over an unlicensed carrier, and transmitting the control-reference transmission on the unlicensed carrier at the location within the scheduled control-reference transmission window.

In an additional aspect of the disclosure, a method of wireless communication includes determining a schedule of downlink control-reference transmission from a serving base station over an unlicensed carrier, transmitting a channel reserving signal over the unlicensed carrier prior to a next control-reference transmission according to the schedule, and receiving the next control-reference transmission over the unlicensed carrier.

In an additional aspect of the disclosure, a method of wireless communication including determining an expected duration of an uplink control-reference transmission reception from a UE served by a base station, transmitting a protection signal, wherein the protection signal identifies a protection duration of at least the duration of the expected duration of the uplink control-reference transmission reception, and monitoring for an expected uplink control-reference transmission.

In an additional aspect of the disclosure, an apparatus configured for wireless communication includes means for generating a control-reference transmission using network information, means for transmitting a channel reserving signals on an unlicensed carrier, prior to a scheduled transmission time of the control-reference transmission, and means for transmitting the control-reference transmission on the unlicensed carrier at the scheduled transmission time.

In an additional aspect of the disclosure, an apparatus configured for wireless communication includes means for generating a control-reference transmission using network information, means for selecting a location within a scheduled control-reference transmission window for transmission of the control-reference transmission over an unlicensed carrier, and means for transmitting the control-reference transmission on the unlicensed carrier at the location within the scheduled control-reference transmission window.

In an additional aspect of the disclosure, an apparatus configured for wireless communication includes means for determining a schedule of downlink control-reference transmission from a serving base station over an unlicensed carrier, means for transmitting a channel reserving signal over the unlicensed carrier prior to a next control-reference transmission according to the schedule, and means for receiving the next control-reference transmission over the unlicensed carrier.

In an additional aspect of the disclosure, an apparatus configured for wireless communication including means for determining an expected duration of an uplink control-reference transmission reception for an expected uplink control-reference transmission transmitted from a UE served by a base station, means for transmitting a protection signal, wherein the protection signal identifies a protection duration of at least the duration of the expected duration of the uplink control-reference transmission reception, and means for monitoring for the expected uplink control-reference transmission.

In an additional aspect of the disclosure, a computer-readable medium having program code recorded thereon. This program code includes code to generate a control-reference transmission using network information, code to transmit a channel reserving signals on an unlicensed carrier, prior to a scheduled transmission time of the control-reference transmission, and code to transmit the control-reference transmission on the unlicensed carrier at the scheduled transmission time.

In an additional aspect of the disclosure, a computer-readable medium having program code recorded thereon. This program code includes code to generate a control-reference transmission using network information, code to select a location within a scheduled control-reference transmission window for transmission of the control-reference transmission over an unlicensed carrier, and code to transmit the control-reference transmission on the unlicensed carrier at the location within the scheduled control-reference transmission window.

In an additional aspect of the disclosure, a computer-readable medium having program code recorded thereon. This program code includes code to determine a schedule of downlink control-reference transmission from a serving base station over an unlicensed carrier, code to transmit a channel reserving signal over the unlicensed carrier prior to a next control-reference transmission according to the schedule, and code to receive the next control-reference transmission over the unlicensed carrier.

In an additional aspect of the disclosure, a computer-readable medium having program code recorded thereon. This program code includes code to determine an expected duration of an uplink control-reference transmission reception for an expected uplink control-reference transmission transmitted from a UE served by a base station, code to transmit a protection signal, wherein the protection signal identifies a protection duration of at least the duration of the expected duration of the uplink control-reference transmission reception, and code to monitor for the expected uplink control-reference transmission.

In an additional aspect of the disclosure, an apparatus includes at least one processor and a memory coupled to the processor. The processor is configured to generate a control-reference transmission using network information, to transmit a channel reserving signals on an unlicensed carrier, prior to a scheduled transmission time of the control-reference transmission, and to transmit the control-reference transmission on the unlicensed carrier at the scheduled transmission time.

In an additional aspect of the disclosure, an apparatus includes at least one processor and a memory coupled to the processor. The processor is configured to generate a control-reference transmission using network information, to select a location within a scheduled control-reference transmission window for transmission of the control-reference transmission over an unlicensed carrier, and to transmit the control-reference transmission on the unlicensed carrier at the location within the scheduled control-reference transmission window.

In an additional aspect of the disclosure, an apparatus includes at least one processor and a memory coupled to the processor. The processor is configured to determine a schedule of downlink control-reference transmission from a serving base station over an unlicensed carrier, to transmit a channel reserving signal over the unlicensed carrier prior to a next control-reference transmission according to the schedule, and to receive the next control-reference transmission over the unlicensed carrier.

In an additional aspect of the disclosure, an apparatus includes at least one processor and a memory coupled to the processor. The processor is configured to determine an expected duration of an uplink control-reference transmission reception for an expected uplink control-reference transmission transmitted from a UE served by a base station, to transmit a protection signal, wherein the protection signal identifies a protection duration of at least the duration of the expected duration of the uplink control-reference transmission reception, and to monitor for the expected uplink control-reference transmission.

BRIEF DESCRIPTION OF THE DRAWINGS

FIG. 7 is a functional block diagram illustrating example blocks executed to implement one aspect of the present disclosure.

FIG. 8A is a functional block diagram illustrating example blocks executed to implement one aspect of the present disclosure.

DETAILED DESCRIPTION

Figure 1:
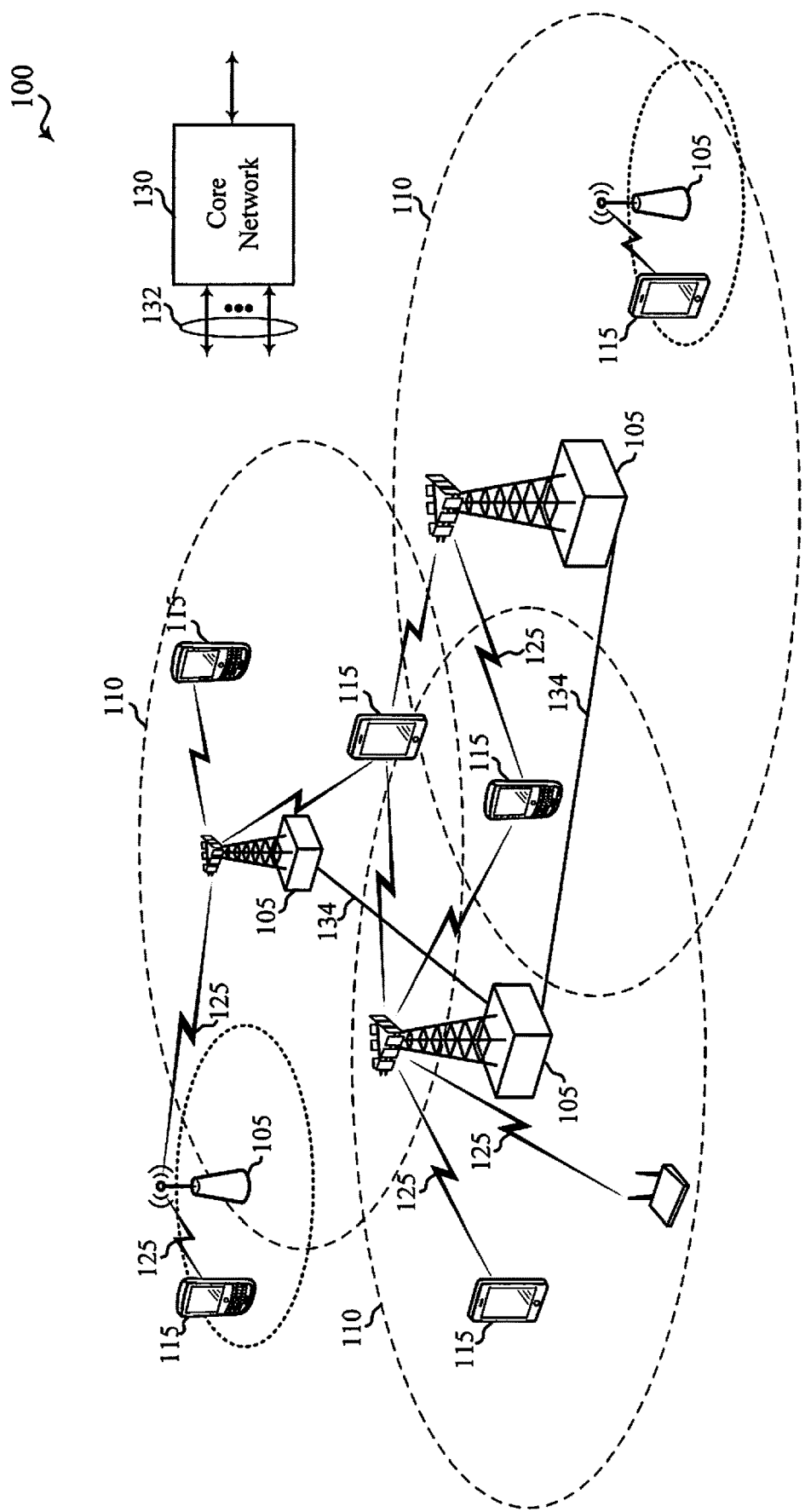
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSO), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., SI, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-11B.

Figure 2A:
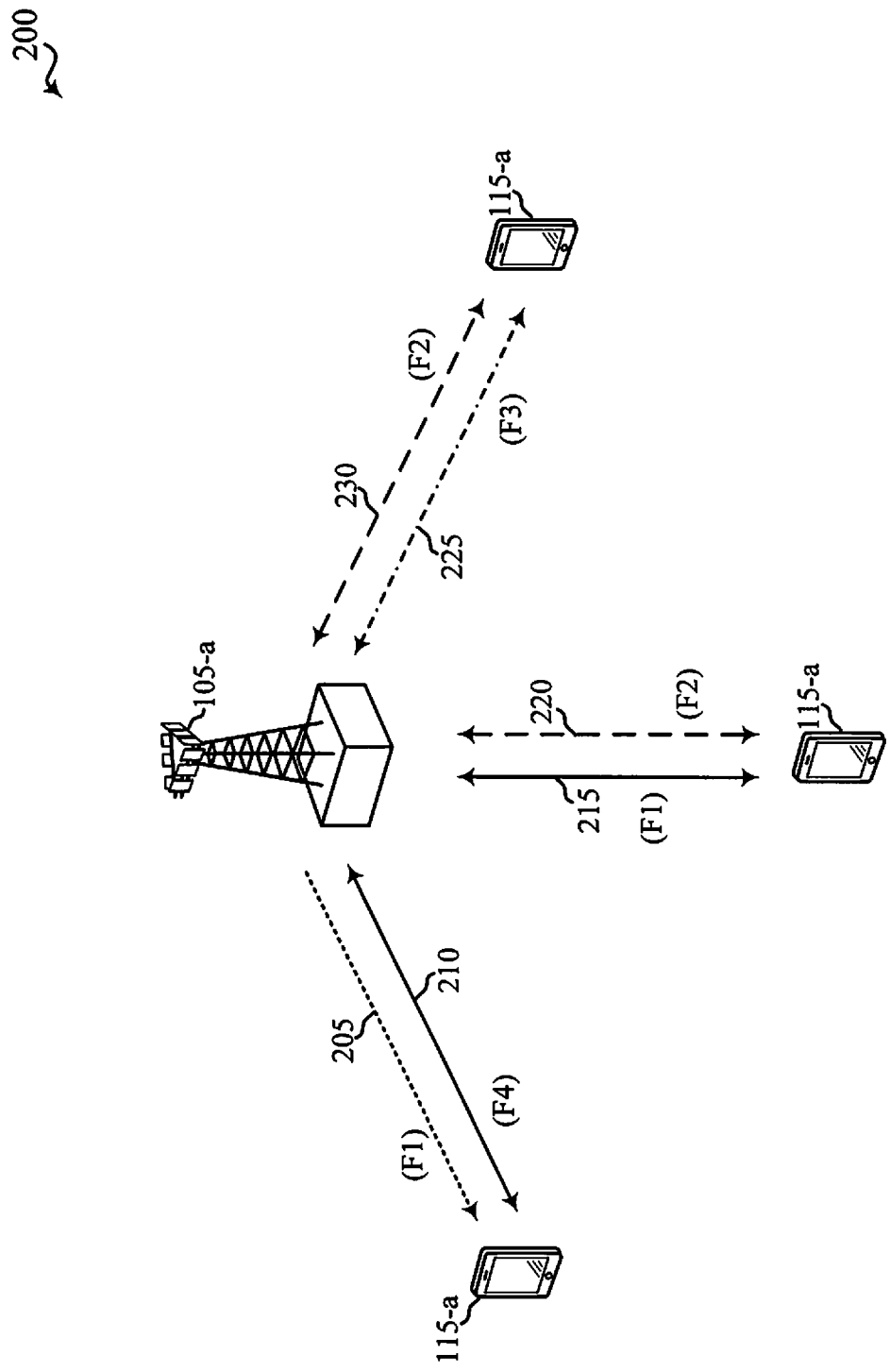
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
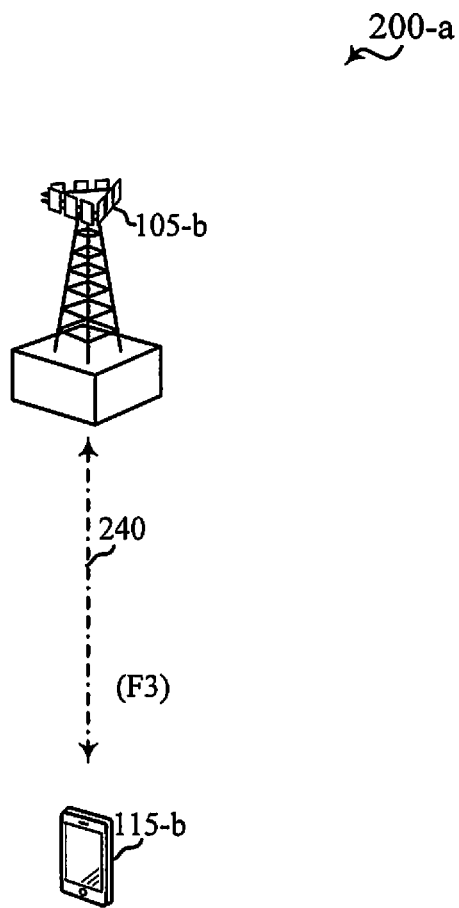
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
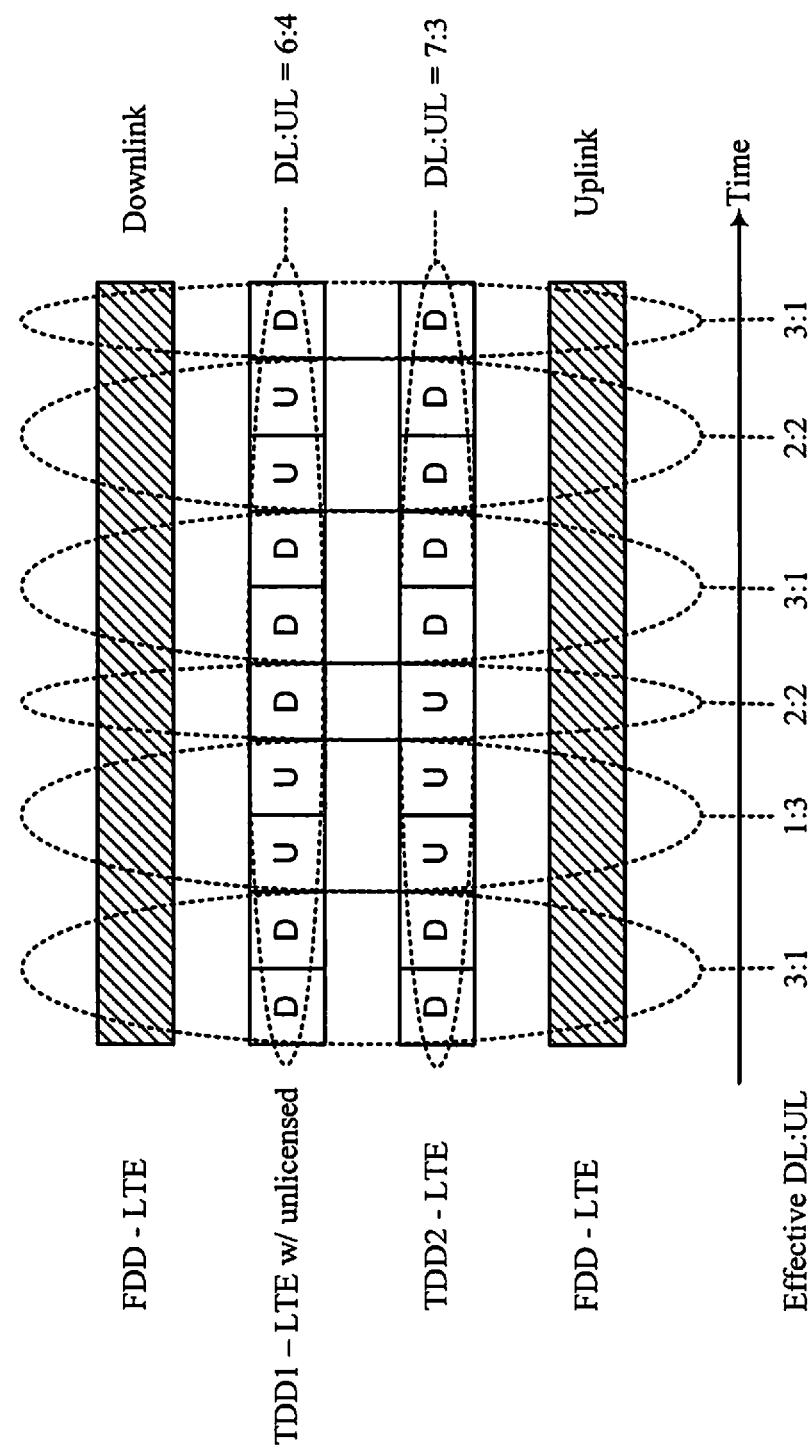
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
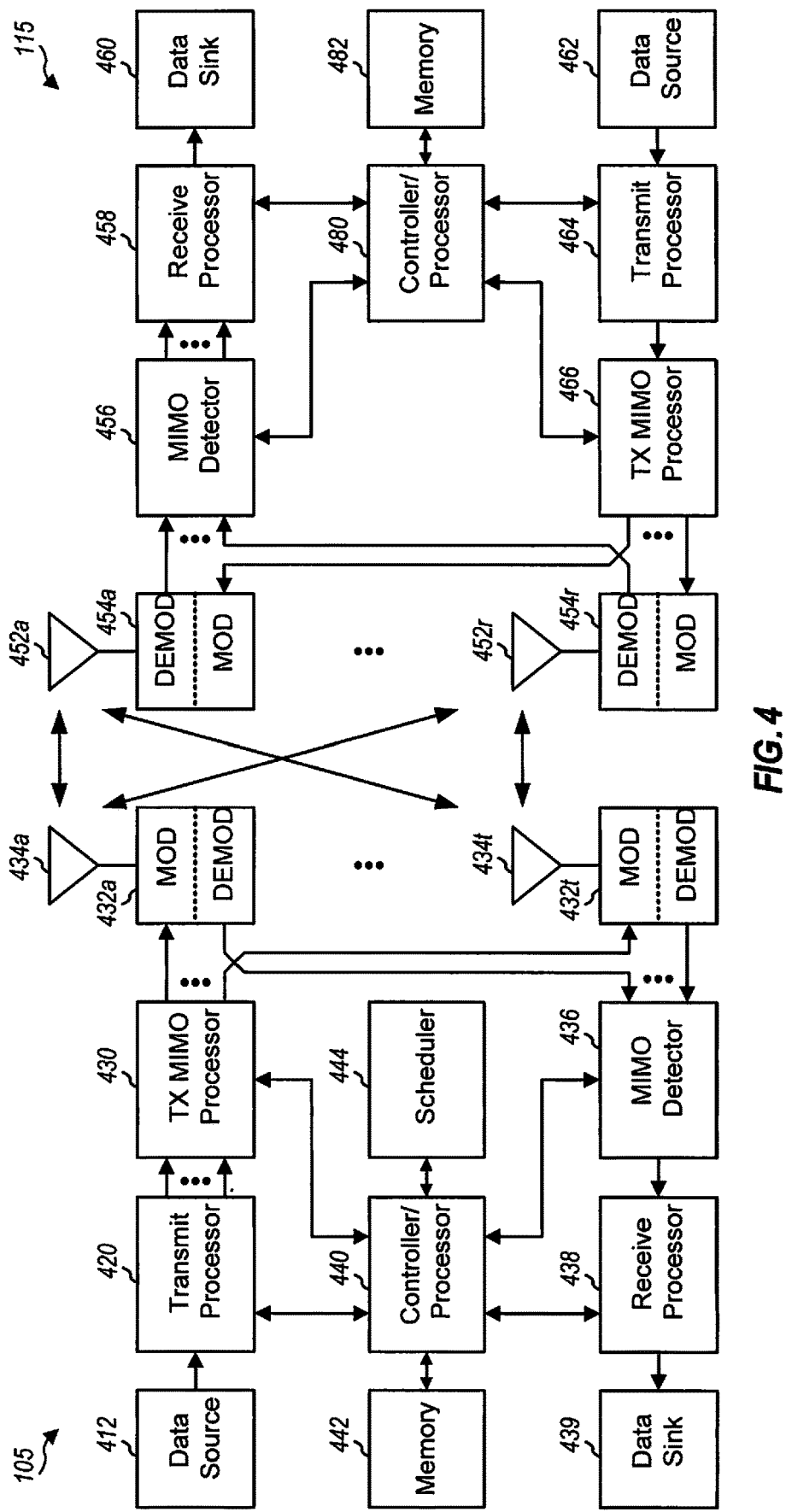
FIG. 4 is a block diagram illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 7, 8A, 9B, and 11B, and/or other processes for the techniques described herein. The memories 442 and 482 may store data and program codes for the eNB 105 and the UE 115, respectively. A scheduler 444 may schedule UEs for data transmission on the downlink and/or uplink.

Most transmissions onto the unlicensed carriers in LTE/LTE-A networks with unlicensed spectrum are made by transmitters after first complying with the LBT protocols. However, certain transmissions are made without first checking for a clear channel. CCA-exempt transmissions (CET) occur in both downlink and uplink communications.

Figure 5:
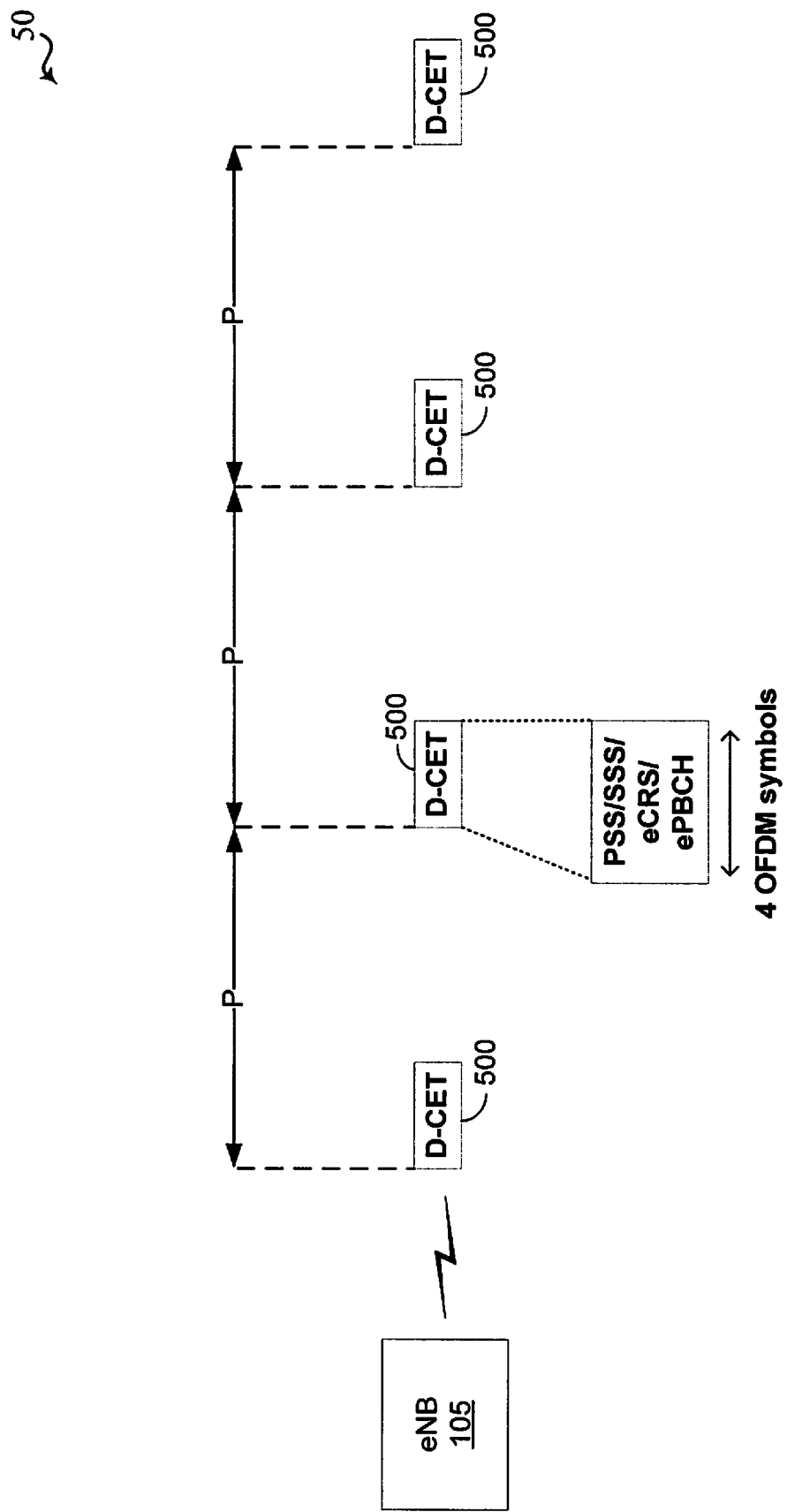
FIG. 5 is a block diagram illustrating a downlink transmission stream over an unlicensed carrier.

FIG. 5 is a block diagram illustrating a downlink transmission stream 50 over an unlicensed carrier. Downlink transmission stream 50 shows periodic transmissions of downlink CET (D-CET) 500 from eNB 105. D-CETs, such as D-CET 500, generally include PSS, SSS, enhanced common reference signals (eCRS), enhanced physical broadcast channel (ePBCH), and the like. The D-CET may also include time/frequency information, the cell identifier (ID), measurements, network parameters, and the like, and spans four OFDM symbols per public land mobile number (PLMN). Thus, D-CET may include various control symbols and/or reference symbols transmitted periodically (control-reference transmissions). D-CET may be transmitted periodically at a certain time period, P. For example, in current system designs, D-CET are transmitted with a periodicity of 80 ms.

In LTE/LTE-A networks with unlicensed spectrum configured for standalone (SA) mode, a UE would first decode the D-CET in order to obtain the information used to access the network. Thus, for SA mode networks, D-CET includes time-critical information for UEs. In contrast, for LTE/LTE-A networks with unlicensed spectrum configured for either supplemental downlink (SDL) or carrier aggregation (CA) modes, the network access information may be provided to UEs in a connected mode through the primary component carrier (PCC). In such networks, the D-CET information is not time-critical for UEs.

In addition to the time-critical information that may be part of CET, as noted above, paging information may also be included in CET. When operating in an SA mode, no additional paging channel would be used. CET may also include upcoming traffic information for UEs. For example, wireless technologies based on IEEE 802.11 may use a traffic indication map (TIM) to indicate upcoming traffic for UEs. Such TIM information may be carried in a beacon signal from a wireless access point.

Figure 6:
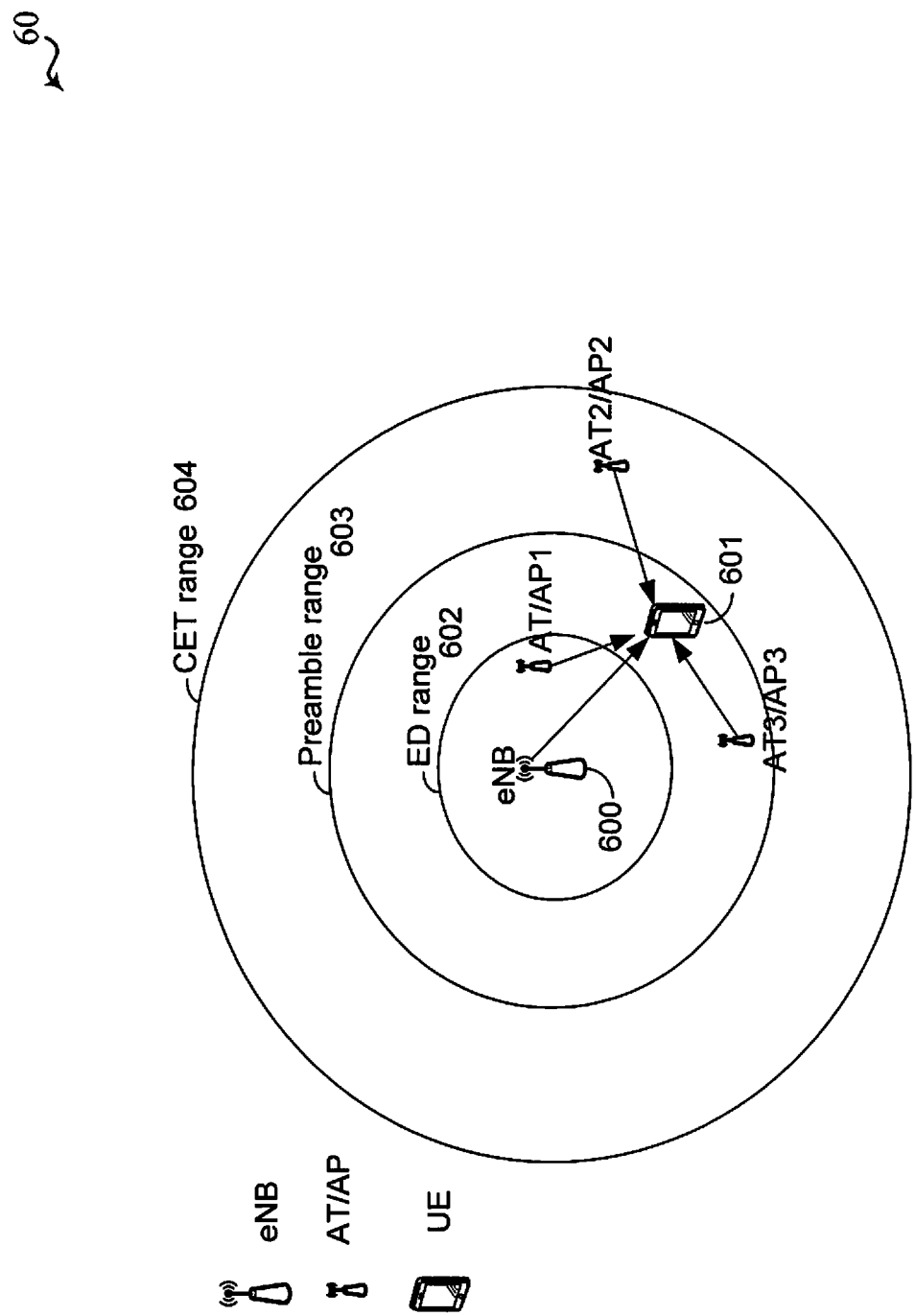
FIG. 6 is a block diagram illustrating wireless network configured to use at least unlicensed carriers for communication.

When CETs carry time-critical information, questions may arise as to whether protection should be provided for CET reception at UEs; especially when those UEs are operating in an SA mode. Since no CCA is performed at the eNB during CET transmission, WiFi interference may exist when CET is transmitted. FIG. 6 is a block diagram illustrating wireless network 60 configured to use at least unlicensed carriers for communication. eNB 600 provides communication network access to UE 601. When eNB 600 transmits a CET, it does not first perform a CCA check. Therefore, neighboring unlicensed access points (e.g., WiFi APs, LTE/LTE-A with unlicensed spectrum base stations, etc.) may be transmitting at the same time as the CET transmission. For example, any one or more of access points, AT/AP1, AT2/AP2, and AT3/AP3 may transmit their beacon signals with some periodicity, subject CCA detection. However, because eNB 600 does not perform CCA when transmitting CET, the CET may be consistently interfered with from adjacent access points.

Access points, AT/AP1, AT2/AP2, and AT3/AP3, may also detect eNB 600's CET and, therefore, backoff of transmissions when their CCA checks are not detected as clear. However, there may still be occasions where UE 601 will experience interference when receiving the CET. For example, AT/AP1 is located with the energy detection range 602 from eNB 600. Within this range, when AT/AP1 detects any transmission signals above a certain power level (e.g., 82 dBm, 68 dBM, etc.), then AT/AP1 may back off on transmissions. Similarly, AT3/AP3 is located within a preamble range 603. Within preamble range 603 any unlicensed band compatible transmitters will back off of transmissions when they are able to receive and decode various signals of neighboring base stations, such as request to send (RTS), clear to send (CTS), or a preamble to other transmission signals. As such, AT3/AP3 may decode a preamble from the signal transmitted by eNB 600 and back off transmissions on the unlicensed band. AT2/AP2 is located within a CET range 604 from eNB 600. CET range 604 is the range in which UEs may accurately receive the CET from eNB 600. However, at this range, AT2/AP2 may not be able to either detect a signal above the energy detection range or decode a preamble of the CET from eNB 600. Thus, AT2/AP2 may continue transmissions. Therefore, UE 601 would experience interference from the unlicensed band transmissions of AT2/AP2 when receiving the CET from eNB 600.

It should be noted that ranges illustrated in FIG. 6 are one example of possible ranges for the various transmissions. Thus, while FIG. 6 shows a larger range for CET compared with the ED/Preamble detection ranges, CET range may also be shorter than either or both of the preamble range or ED range, depending on the deployment configurations, distances, and power of the transmitters.

Various aspects of the present disclosure provide for procedures and configurations that may be implemented to protect the transmission or reception of CET at the CET transmitting/receiving entities. For example, certain aspects provide protection to the base station for D-CET transmission, while other aspects provide protection to the UE for D-CET reception. Similarly, additional aspects of the present disclosure provide protections to the UE for U-CET transmission, while other aspects provide protection to the base stations for U-CET receptions.

FIG. 7 is a functional block diagram illustrating example blocks executed to implement one aspect of the present disclosure. At block 700, a base station or transmitter generates a CET using network information. For example, the base station or transmitter would use PSS, SSS, eCRS, ePBCH, and the like, to generate the CET. The base station or transmitter may also include time/frequency information, the cell ID, measurements, network parameters, and the like.

At block 701, the base station or transmitter transmits a channel reserving signal on an unlicensed carrier prior to any scheduled transmission times of the CET. A channel reserving signal may include signals such as CUBS, RTS, CTS, or the like, which will be transmitted before CET transmission. The channel reserving signal transmission may be part of signal scheduling right before the CET transmission. For example, CCA is performed before CET transmission.

At block 702, the base station or transmitter transmits the CET on the unlicensed carrier at the scheduled transmission time. The channel reserving signal transmission may be received and/or decoded by neighboring access points, which would cause such access points to back off of interfering transmissions. However, this may not completely protect the UE from interference from access points that are close to the UE, but further away from the base station transmitting the CET, such as, for example, AT2/AP2 (FIG. 6).

Figure 8B:
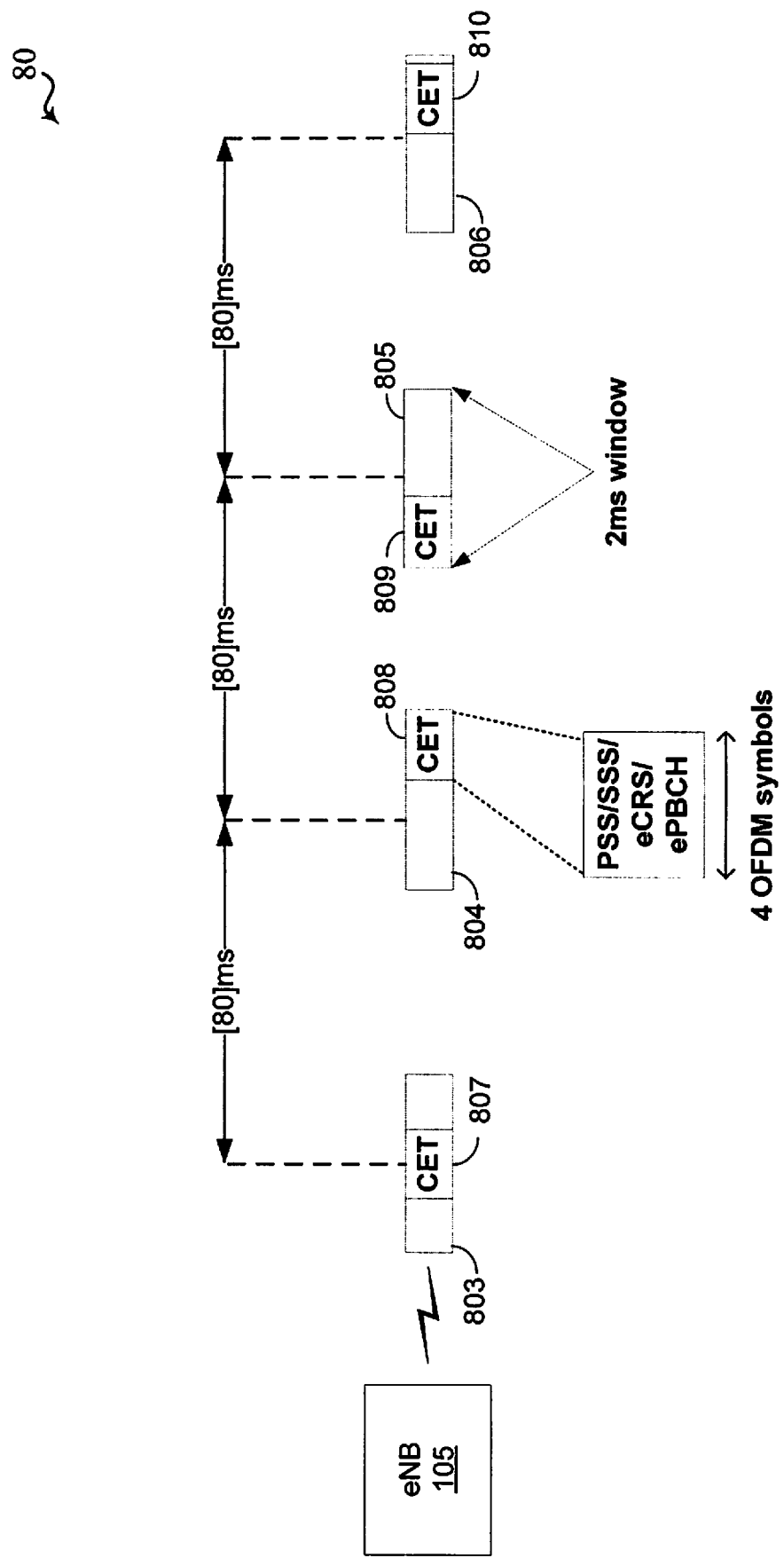
FIG. 8B is a block diagram illustrating transmission stream in a communication system configured according to one aspect of the present disclosure.

FIG. 8A is a functional block diagram illustrating example blocks executed to implement one aspect of the present disclosure. At block 800, a base station or transmitter generates a CET using network information. At block 801, the base station selects a location within a scheduled CET transmission window for transmission of the CET over an unlicensed carrier. FIG. 8B is a block diagram illustrating transmission stream 80 in a communication system configured according to one aspect of the present disclosure. With reference to transmission stream 80 of FIG. 8B, a CET, such as CETs 807-810, are transmitted in a CET transmission window, such as CET transmission windows 803-806, by eNB 105. CET transmission windows 803-806, illustrated as having a duration of 2 ms, provide multiple possible locations for the base station to transmit the CET. Because the CET is only four OFDM symbols in length, the base station, eNB 105, may use various means for selecting a CET location within the CET transmission window, such as a randomized pattern, predefined pattern, hopping patter, and the like. At block 802, the base station, such as eNB 105, transmits the CET on the unlicensed carrier at the location within the scheduled CET transmission window.

In execution of the blocks illustrated in FIG. 8A, the eNB transmits CET, such as CETs 807-810 (FIG. 8B), with varying location over the fixed windows of CET transmission windows 803-806. The base station, eNB 105, may change the location of CET placement over time within this window. For a given PLMN, such change of location may be predefined. For example, a randomized bopping pattern for a given PLMN may be predefined and broadcast to users accessing the PLMN. Thus, UEs in communication with eNB 105 may know the randomized hopping pattern and expect to locate the CET transmissions at their specifically selected locations within the CET transmission window. In other examples, multiple pre-defined locations may be broadcast which are sequentially selected based on time, or the like.

While the various aspects of the present disclosure that provide CET reception protection through transmissions made by the base station will provide some degree of reception protection to the UEs, these options may not provide full protection against interference when receiving CET. Additional aspects of the present disclosure provide for the UE to take action in protecting its own reception of the CETs.

Figure 9A:
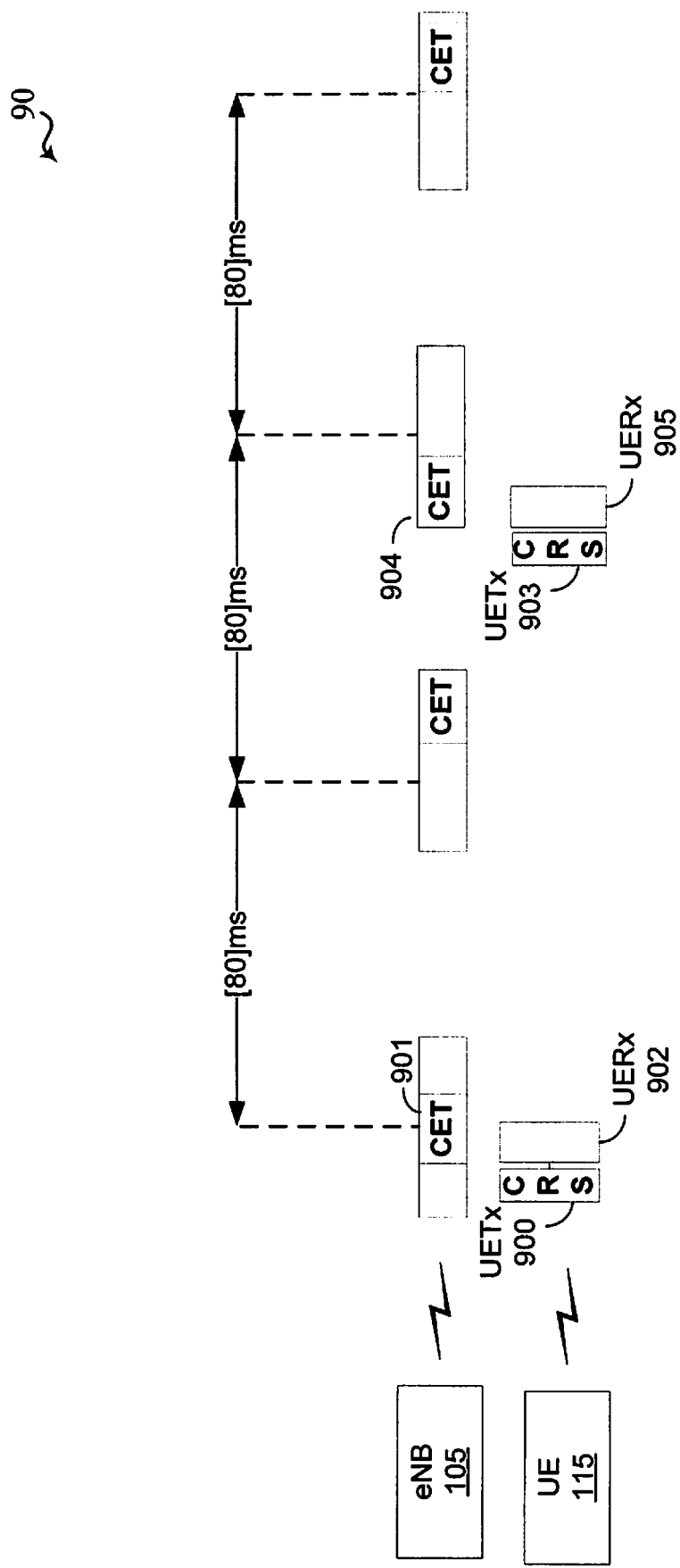
FIG. 9A is a block diagram illustrating a transmission stream of a communication system configured according to one aspect of the present disclosure.

FIG. 9A is a block diagram illustrating a transmission stream 90 of a communication system configured according to one aspect of the present disclosure. In order to more actively protect CET reception, a UE 115 transmits a channel reserving signal prior to the scheduled CET transmission known from eNB 105. Thus, channel reserving signals 900 and 903 are transmitted by UE 115 prior to CETs 901 and 904. The transmission of channel reserving signals 900 and 903 will serve to reserve the unlicensed carrier in the coverage area surrounding the UE. Thus, any neighboring access points that could potentially cause interference to CET reception will detect channel reserving signals 900 and 903 and refrain from transmitting the interfering signals. UE 115 will then have a more clear CET reception period 902 and 905.

Figure 9D:
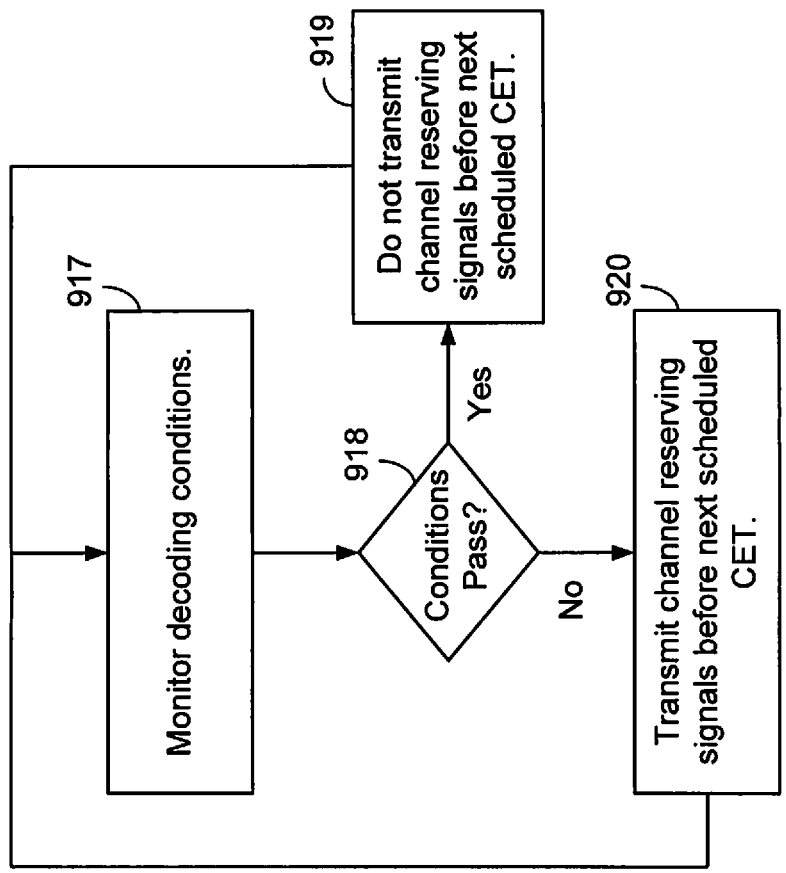
FIG. 9D is a functional block diagram illustrating example blocks executed to implement one aspect of the present disclosure.
Figure 9B:
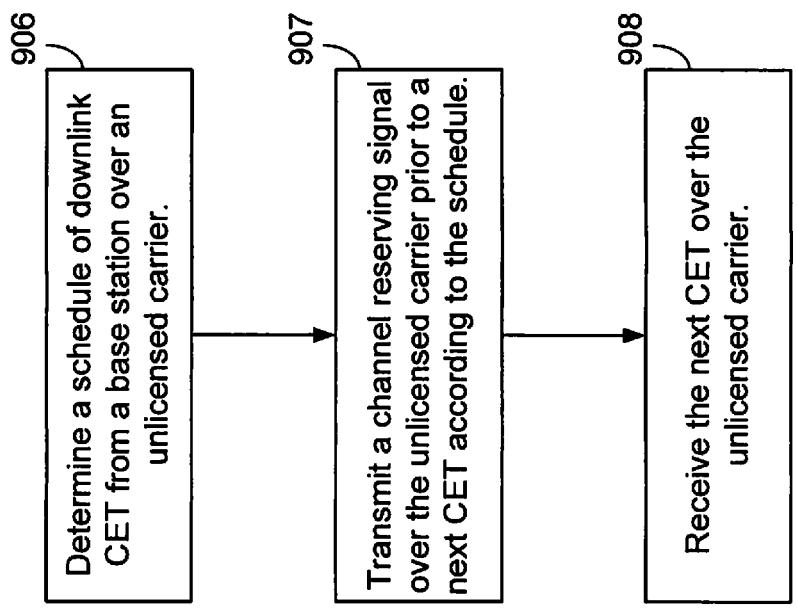
FIG. 9B is a functional block diagram illustrating example blocks executed to implement one aspect of the present disclosure.

FIG. 9B is a functional block diagram illustrating example blocks executed to implement one aspect of the present disclosure. At block 906, a UE determines a schedule of downlink CET from a base station over an unlicensed carrier. For example, a UE may discover the CET transmission schedule from the base station when the UE enters the service area of the base station through broadcast system information.

At block 907, the UE transmits a channel reserving signal over the unlicensed carrier prior to the next scheduled CET. The channel reserving signal may be a CUBs, RTS, or CTS that reserves at least the next transmission frame (CUBs) or a defined length of time (RTS or CTS). Any neighboring transmitters that perform an LBT procedure may detect the CUBS or decode and read the RTS or CTS and refrain from interfering transmissions for the certain amount of time.

At block 908, the UE receives the next CET over the unlicensed carrier. With the previous transmission of the channel reserving signal, the potentially interfering neighboring transmitters would refrain from transmissions and, thus, the potential interference over the unlicensed carrier is reduced for CET reception at the UE.

It should be noted that the example aspect disclosed with regard to FIG. 9B may not be applicable for initial system access when timing is unknown.

Figure 9C:
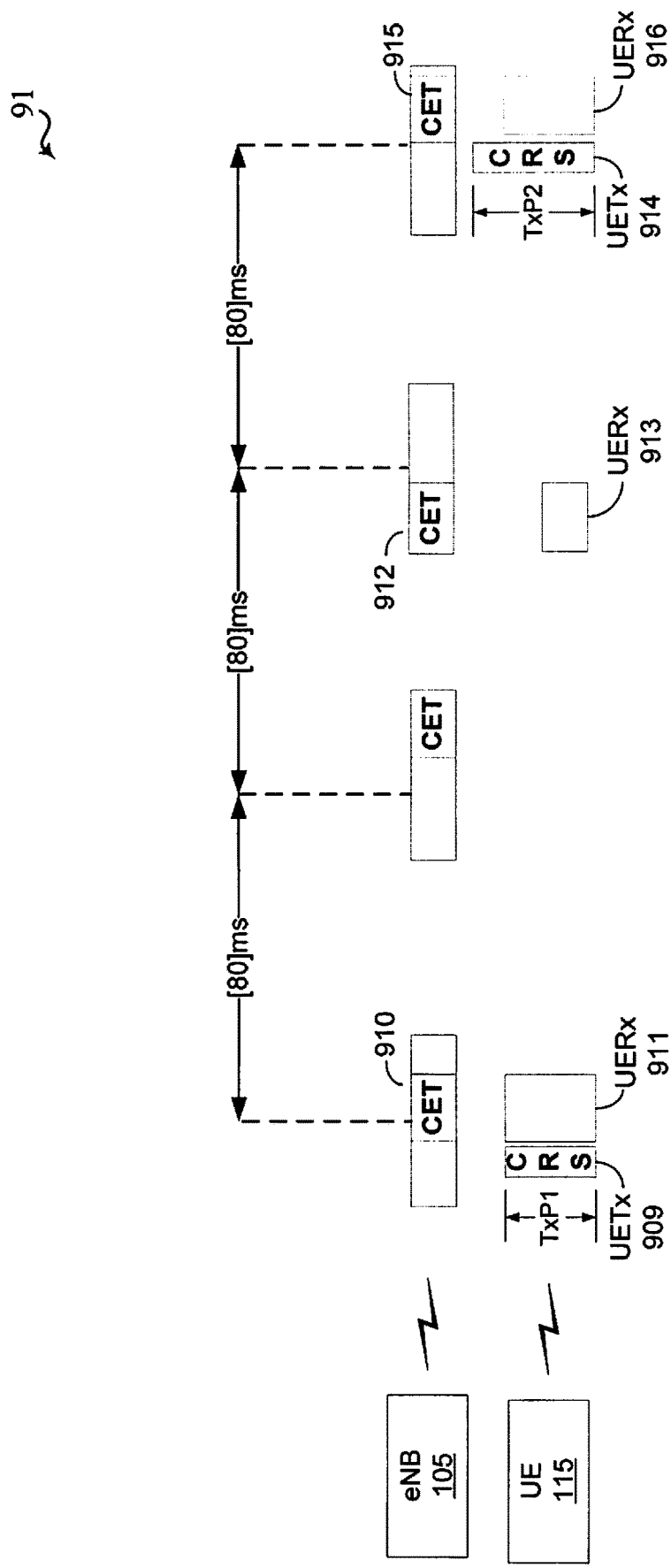
FIG. 9C is a block diagram illustrating a transmission stream in a communication system configured according to one aspect of the present disclosure.

FIG. 9C is a block diagram illustrating a transmission stream 91 in a communication system configured according to one aspect of the present disclosure. A UE 115 may selectively transmit the channel reserving signal before decoding CET from eNB 105. Moreover, the transmit power of the channel reserving signal may be adaptively changed such that the transmit power for the channel reserving signal is minimized for power saving purpose. For example, UE 115 transmitting channel reserving signal 909 before the scheduled transmission of CET 910 from eNB 105 may transmit channel reserving signal 909 at a certain power, TxP1. At the receiving period UERX 911, UE 115 receives CET 910. At the next occasion on which UE 115 attempts to receive the CET, CET 912, UE 115 elects not to transmit a channel reserving signal before the transmission of CET 912 by eNB 105 because of the previous successful decoding of CET 910. However, during the receiving period UERX 913, UE 105 fails to receive or decode CET 912. In response to the failed decode attempt, UE 105 selects to transmit a channel reserving signal 914 at a higher transmission power, TxP2. The higher transmission power may help to more clearly reach any neighboring access points that could provide interfering transmissions. Thus, at receiving period UERX 916, UE 105 is able to decode CET 915 with less interference from neighboring access points.

The determination of when to transmit the channel reserving signal may also be controlled by some various loops or by monitoring the failure rate of CET decoding or of the channel conditions at CET decoding. FIG. 9D is a functional block diagram illustrating example blocks executed to implement one aspect of the present disclosure. At block 917, a UE monitors the decoding conditions associated with the UE location. At block 918, a determination is made whether the decoding conditions are satisfactory. If the decoding conditions are satisfactory, then, at block 919, the UE determines not to transmit a channel reserving signal prior to the next scheduled CET. Otherwise, if the decoding conditions are not satisfactory, then, at block 920, the UE elects to transmit a channel reserving signal prior to the next scheduled CET.

For example, a decoding condition may be monitored by monitoring signal quality during the available paging occasions for a given base station. A base station may broadcast a paging persistency parameter, which identifies how many times that paging occasions will be repeated. The UE attempts to decode at every paging occasion and logs a measurement of the signal quality, such as the signal-to-noise ratio (SNR), signal-to-interference plus noise ratio (SINR), and the like. The UE counts how many consecutive paging occasions the signal quality was too low for accurate decoding. If the count approaches the minimum of either the paging persistency parameter or the desired paging latency for the UE, the UE will transmit a channel reserving signal before the next paging occasion.

Another example decoding condition may simply be to monitor the success rate in CET decoding. If a UE fails to decode a CET, it may determine that the decoding conditions are unsatisfactory and elect to transmit a channel reserving signal prior to the next scheduled CET. Every successful decode would reset the CUBS cycle, so CUBS transmission need not be periodic.

It should be noted that various aspects of the present disclosure may provide for different decoding conditions or loops that trigger a UE to transmit a channel reserving signal prior to a scheduled CET.

Figure 10:
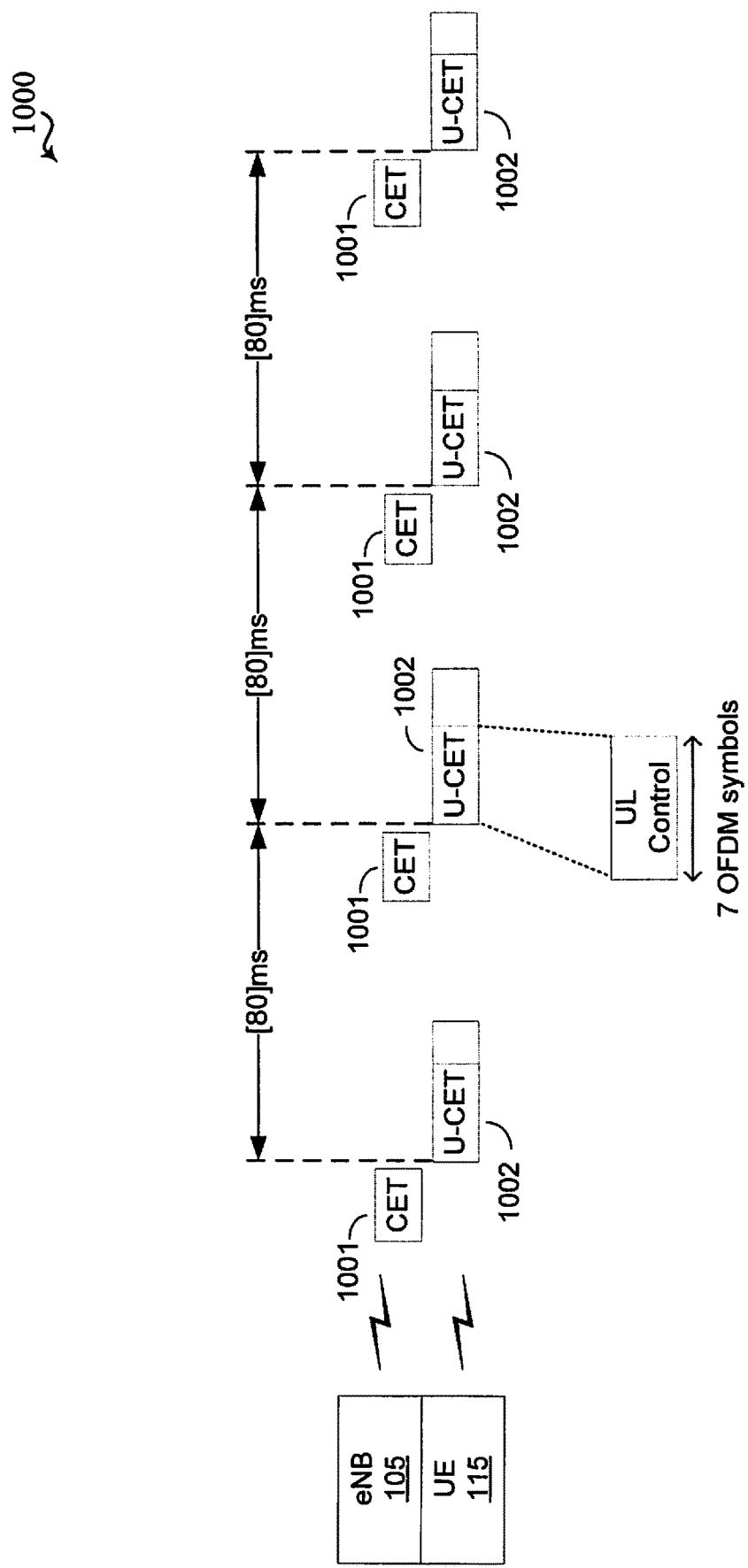
FIG. 10 is a block diagram illustrating a transmission stream in a communication system configured according to one aspect of the present disclosure.

In addition to providing protections for the receiving of downlink CET, various additional aspects of the present disclosure provide for protections of the receiving of uplink CET. FIG. 10 is a block diagram illustrating a transmission stream 1000 in a communication system configured according to one aspect of the present disclosure. The communication system according to the example aspect provides for uplink CET 1002 from UE 105 to be slaved to the downlink CET 1001 timing of eNB 105. In this regard, the transmission of the downlink CET 1001 provides some interference protection against neighboring transmissions. Thus, there may be less interference right after a downlink CET 1001. Accordingly the uplink CET 1002 is slaved to that downlink CET 1001 timing. Uplink CET 1002 include periodic transmission of control frames and uplink control information (e.g., SRS/PRACH/CSI/SR) with a duty cycle typically less than 5%.

It should be noted that, the slaving of the uplink CET to the downlink CET may also occur in aspects of the present disclosure in which the downlink CET is transmitted over a CET transmission window using a randomized hopping scheme over time.

Figure 11A:
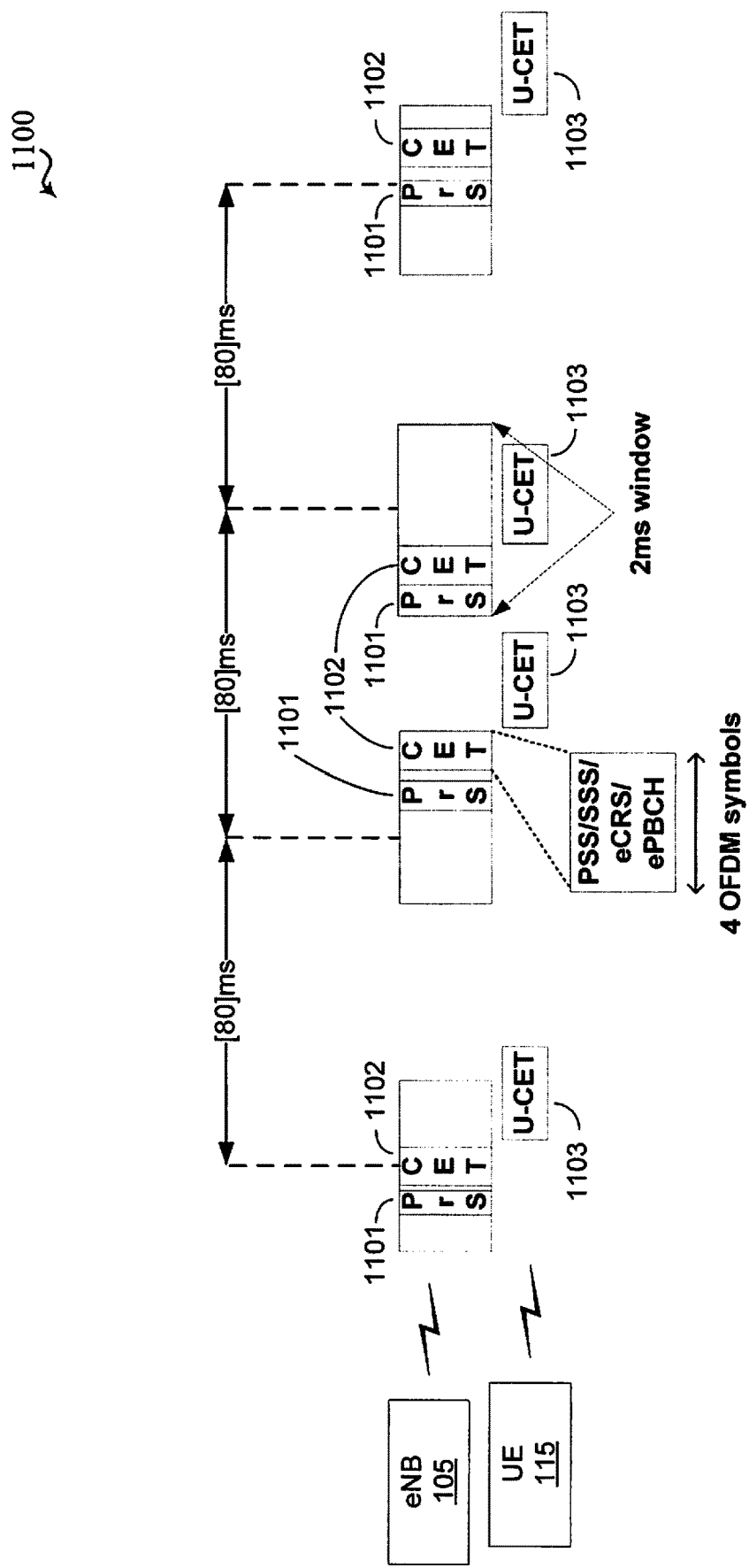
FIG. 11A is a block diagram illustrating a transmission stream of a communication system configured according to one aspect of the present disclosure.

FIG. 11A is a block diagram illustrating a transmission stream 1100 of a communication system configured according to one aspect of the present disclosure. Another manner in which to protect uplink CET is for the base station to transmit a protection signal prior to transmitting the downlink CET. A protection signal may be an informational signal, such as a CTS or RTS, in which the base station designates a specific length of time during which neighboring transmitters should not transmit onto the unlicensed carrier. For example, eNB 105 transmits protection signal 1101 which provides a duration of protection that includes both the duration of the transmission of CET 1102 and the expected duration of the receiving of uplink CET 1103 from the UE. Each neighboring transmitter that receives and decodes protection signal 1101 will refrain from transmitting onto the unlicensed carrier for the entire duration identified in protection signal 1101.

Figure 11B:
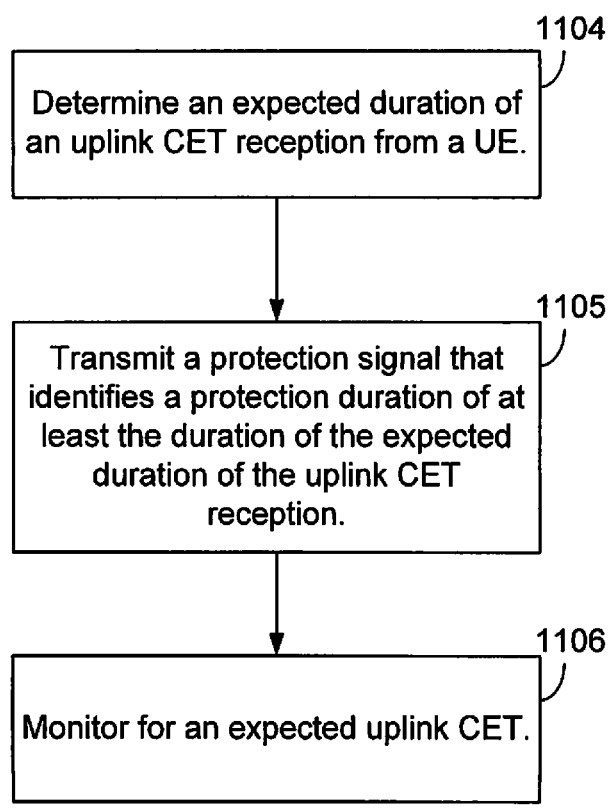
FIG. 11B is a functional block diagram illustrating example blocks executed to implement one aspect of the present disclosure.

FIG. 11B is a functional block diagram illustrating example blocks executed to implement one aspect of the present disclosure. At block 1104, a base station determines an expected duration of an uplink CET reception from a UE. The base station will know the length of an uplink CET that is expected from a UE. In order to obtain at least the protection for receiving the uplink CET, the base station first determines this duration.

At block 1105, the base station transmits a protection signal that identifies a protection duration of at least the duration of the expected duration of the uplink CET reception. When the protection signal includes the protection duration of just the expected uplink CET reception, the base station may transmit the protection signal after transmitting the downlink CET, but before the expected transmission of the uplink CET. However, in additional aspects, the protection duration may also include the duration of the downlink CET. Thus, the base station may transmit the protection prior to the CET transmission, in which the protection duration identifies to neighboring transmitters the amount of time from the downlink CET transmission until the end of the uplink CET reception that the neighboring transmitters will not transmit over the unlicensed carrier.

At block 1106, the base station will then monitor for the expected uplink CET. With the protection signal protecting against interfering transmissions from the downlink CET transmission through the uplink CET reception, the base station should experience a reduction of the potential interference.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7, 8A, 9B, and 11B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   generating a control-reference transmission using network information, the control-reference transmission to be transmitted over a transmission channel of an unlicensed carrier;
   scheduling a transmission time for the control-reference transmission, wherein the control-reference transmission includes a clear channel assessment exempt transmission (CET), and wherein the control-reference transmission is transmitted without evaluating whether the transmission channel is clear;
   transmitting channel reserving signals on the unlicensed carrier, prior to the scheduled transmission time of the control-reference transmission; and
   transmitting the control-reference transmission on the unlicensed carrier at the scheduled transmission time.

2. The method of claim 1, wherein the channel reserving signals include at least one of:
   a channel usage beacon signal (CUBS);
   a request to send (RTS) signal; or
   a clear to send (CTS) signal.

3. The method of claim 1, wherein the network information includes one or more of:
   synchronization information associated with a base station;
   a common reference signal (CRS) associated with the base station;
   a broadcast channel associated with the base station;
   timing information associated with the base station;
   frequency information associated with the base station;
   cell identifier (ID) of the base station;
   channel condition measurements associated with the base station;
   one or more network parameters associated with the base station;
   paging information associated with one or more user equipment (UE) served by the base station; and
   upcoming traffic information associated with the one or more UE served by the base station.

4. The method of claim 1, further comprising, after the transmitting the control-reference transmission, receiving a second CET from a user equipment (UE) device.

5. The method of claim 4, wherein the receiving the second CET occurs at a particular time that is based on the scheduled transmission time.

6. The method of claim 4, wherein a particular transmission time of the second CET is synchronized to the scheduled transmission time of the CET to reduce or avoid interference associated with one or more other signals.

7. The method of claim 4, wherein the second CET includes one or more of a sounding reference signal (SRS), a physical random access channel (PRACH) signal, channel state information (CSI), or a scheduling request (SR).

8. An apparatus configured for wireless communication, comprising:
   means for generating a control-reference transmission using network information, the control-reference transmission to be transmitted over a transmission channel of an unlicensed carrier;
   means for scheduling a transmission time for the control-reference transmission, wherein the control-reference transmission includes a clear channel assessment exempt transmission (CET), and wherein the control-reference transmission is transmitted without evaluating whether the transmission channel is clear;
   means for transmitting channel reserving signals on the unlicensed carrier, prior to a scheduled transmission time of the control-reference transmission; and
   means for transmitting the control-reference transmission on the unlicensed carrier at the scheduled transmission time.

9. The apparatus of claim 8, wherein the channel reserving signals include at least one of:
   a channel usage beacon signal (CUBS);
   a request to send (RTS) signal; or
   a clear to send (CTS) signal.

10. The apparatus of claim 8, wherein the network information includes one or more of:
    synchronization information associated with a base station;
    a common reference signal (CRS) associated with the base station;
    a broadcast channel associated with the base station;
    timing information associated with the base station;
    frequency information associated with the base station;
    cell identifier (ID) of the base station;
    channel condition measurements associated with the base station;
    one or more network parameters associated with the base station;
    paging information associated with one or more user equipment (UE) served by the base station; and
    upcoming traffic information associated with the one or more UE served by the base station.

11. A non-transitory computer-readable medium having program code recorded thereon, the program code including:
    program code for causing a computer to generate a control-reference transmission using network information, the control-reference transmission to be transmitted over a transmission channel of an unlicensed carrier;
    program code for causing the computer to schedule a transmission time for the control-reference transmission, wherein the control-reference transmission includes a clear channel assessment exempt transmission (CET), and wherein the control-reference transmission is transmitted without evaluating whether the transmission channel is clear;
    program code for causing the computer to transmit channel reserving signals on the unlicensed carrier, prior to a scheduled transmission time of the control-reference transmission; and
    program code for causing the computer to transmit the control-reference transmission on the unlicensed carrier at the scheduled transmission time.

12. The non-transitory computer-readable medium of claim 11, wherein the channel reserving signals include at least one of:
 a channel usage beacon signal (CUBS);
 a request to send (RTS) signal; or
 a clear to send (CTS) signal.

13. The non-transitory computer-readable medium of claim 11, wherein the network information includes one or more of:
 synchronization information associated with a base station;
 a common reference signal (CRS) associated with the base station;
 a broadcast channel associated with the base station;
 timing information associated with the base station;
 frequency information associated with the base station;
 cell identifier (ID) of the base station;
 channel condition measurements associated with the base station;
 one or more network parameters associated with the base station;
 paging information associated with one or more user equipment (UE) served by the base station; and
 upcoming traffic information associated with the one or more UE served by the base station.

14. An apparatus configured for wireless communication, the apparatus comprising:
 at least one processor; and
 a memory coupled to the at least one processor,
 wherein the at least one processor is configured:
  to generate a control-reference transmission using network information, the control-reference transmission to be transmitted over a transmission channel of an unlicensed carrier;
  to schedule a transmission time for the control-reference transmission, wherein the control-reference transmission includes a clear channel assessment exempt transmission (CET), and wherein the control-reference transmission is transmitted without evaluating whether the transmission channel is clear;
  to transmit channel reserving signals on the unlicensed carrier, prior to a scheduled transmission time of the control-reference transmission; and
  to transmit the control-reference transmission on the unlicensed carrier at the scheduled transmission time.

15. The apparatus of claim 14,
 wherein the channel reserving signals include at least one of:
 a channel usage beacon signal (CUBS);
 a request to send (RTS) signal; or
 a clear to send (CTS) signal.

16. The apparatus of claim 14, wherein the network information includes one or more of:
 synchronization information associated with a base station;
 a common reference signal (CRS) associated with the base station;
 a broadcast channel associated with the base station;
 timing information associated with the base station;
 frequency information associated with the base station;
 cell identifier (ID) of the base station;
 channel condition measurements associated with the base station;
 one or more network parameters associated with the base station;
 paging information associated with one or more user equipment (UE) served by the base station; and
 upcoming traffic information associated with the one or more UE served by the base station.

\* \* \* \* \*